United States Patent
Kawahira

(10) Patent No.: US 8,863,875 B2
(45) Date of Patent: Oct. 21, 2014

(54) AIR GUIDE PLATE FOR AUTOMOBILE AND SEALING STRUCTURE

(75) Inventor: Hiroshi Kawahira, Toyota (JP)

(73) Assignee: Kojima Press Industry Co., Ltd., Toyota-Shi (JP)

(*) Notice: Subject to any disclaimer, the term of this patent is extended or adjusted under 35 U.S.C. 154(b) by 482 days.

(21) Appl. No.: 12/961,726

(22) Filed: Dec. 7, 2010

(65) Prior Publication Data
US 2011/0132677 A1 Jun. 9, 2011

(30) Foreign Application Priority Data
Dec. 9, 2009 (JP) ................................. 2009-279025

(51) Int. Cl.
*B60K 11/08* (2006.01)
(52) U.S. Cl.
CPC ...................................... *B60K 11/08* (2013.01)
USPC .......................... 180/68.1; 180/68.4; 180/68.6
(58) Field of Classification Search
USPC .................. 180/68.1, 68.4; 277/628
See application file for complete search history.

(56) References Cited

U.S. PATENT DOCUMENTS

| 5,269,367 A | 12/1993 | Susa et al. |
| 2001/0027883 A1 | 10/2001 | Sasano et al. |

FOREIGN PATENT DOCUMENTS

| DE | 10 2005 051 659 B3 | 8/2007 | |
| FR | 2 804 638 A1 | 8/2001 | |
| FR | 2804638 A1 * | 8/2001 | |
| FR | 2 922 493 A1 | 4/2009 | |
| JP | 05-071891 | 3/1993 | |
| JP | 08-295122 A1 | 11/1996 | |
| JP | 08295122 A * | 11/1996 | ............... B60H 1/00 |
| JP | 2005-096684 A1 | 4/2005 | |
| JP | 2007-055522 A1 | 3/2007 | |
| JP | 2007-326431 A1 | 12/2007 | |
| JP | 2008-18833 | 1/2008 | |

OTHER PUBLICATIONS

Japanese Office Action, Japanese Application No. 2009-279025, dated Sep. 10, 2013 (2 pages).
Japanese Office Action (Application No. 2009-279025) dated Feb. 25, 2014.

\* cited by examiner

*Primary Examiner* — Katy M Ebner
(74) *Attorney, Agent, or Firm* — Burr & Brown, PLLC

(57) ABSTRACT

The air guide plate includes a plate body formed of a resin material and deformable skirt portions which are formed of the same resin material as the plate body and integrally formed on an outer periphery of the plate body. The air guide plate is arranged such that the plate body is disposed at a front of an automobile without connecting to automobile parts, thereby forming a gap between the outer periphery of the plate body and the automobile parts arranged around the plate body. The deformable skirt portions are disposed so as to be in contact with the automobile parts under flexural deformation, thereby closing the gap by the deformable skirt portions to prevent the air from leaking through the gap.

13 Claims, 3 Drawing Sheets

AIR GUIDE PLATE FOR AUTOMOBILE AND SEALING STRUCTURE

The present application is based on Japanese Patent Applications No. 2009-279025 filed on Dec. 9, 2009, the contents of which are incorporated herein by reference.

BACKGROUND OF THE INVENTION

1. Field of the Invention

The present invention relates to an air guide plate for automobile and a sealing structure, and in particularly to an improved structure of an air guide plate which is arranged at a front of an automobile and guides an air flow produced during driving of an automobile to a radiator, and an air guide plate having such an improved structure, and further a novel structure for sealing a gap formed between the air guide plate and an automobile part positioned around the air guide plate.

2. Discussion of Related Art

Generally, a predetermined gap or space, i.e., a designed gap is formed between automobile parts that are positioned close to each other, in order to prevent noise, damage and deformation of automobile parts, for example, that are caused by a contact of the automobile parts by vibration during driving (see JP-A-2007-55522, for example).

For example, at a front of an automobile, air guide plates for guiding an airflow produced during driving of the automobile to a radiator are disposed so as to extend in a front and back direction of the automobile in a state that the air guide plates are disposed between a shroud, which is disposed so as to cover sides of the radiator, and a bumper, which is positioned in front of the radiator, such that the air guide plates are opposed to each other in a width direction of the automobile, alternatively or in addition, such that the air guide plates are opposed to each other in a vertical direction. Between the air guide plate and various automobile parts such as a shroud, radiator, radiator support, bumper, bumper reinforcement, lower absorber, upper absorber, harness, various hoses such as a hose for air conditioner, which are positioned around the air guide plate, and another air guide plate that is adjacent to the air guide plate, the space as the above designed gap is formed.

However, when the gap is formed between the air guide plate and the automobile part, the air guided by the air guide plate leak or escape through the gap to the outside. As a result, the cooling efficiency of the radiator is deteriorated. Further, through the gap, hot air from the engine may be sent to the radiator side. It also poses a risk of deteriorating cooling efficiency of the radiator. Furthermore, due to the fact that the air leak through the gap between the air guide plate and automobile part, the aerodynamic performance may be deteriorated.

Conventionally, various cushioning materials such as sponge are disposed in the gap formed between the air guide plate and the automobile part positioned around the air guide plate so as to fill the gap, thereby sealing the gap between the air guide plate and the automobile part. However, the cushioning material is generally adhered and fixed by double-stick tape, for example, to the opposing portions of the air guide plate and the automobile part that are opposed to each other with the gap therebetween. Thus, if the gap has a relatively complex shape, for example, the adhesion of the cushioning material to each of the opposing portions of the air guide plate and automobile part would be varied. As a result, it may be difficult to secure the stable sealing properties. Further, the cushioning material may come off the air guide plate or the automobile part, when the air guide plate and the automobile part are displaced so as to separate from each other due to the vibration occurred during driving. In addition, there is another problem that a bonding process of the cushioning material is troublesome.

To prevent the air from leaking through the gap between the automobile part and the air guide plate, there is conventionally employed a structure in which a sealing member made of rubber or elastomer is integrally formed on an outer periphery of the plate body by co-injection molding. The sealing member integrally formed on the plate body is disposed so as to be in contact with the automobile part positioned around the air guide plate, under installation of the air guide plate to the automobile. However, the air guide plate used therein generally has a plate body made of resin material. Therefore, the air guide plate integrally including the sealing member made of rubber or elastomer is obtained by using two kinds of materials, i.e., rubber material or elastomer material and resin material. Thus, high cost of material is required for such an air guide plate. In addition, recycling of the air guide plate is troublesome, because the plate body and the sealing member need to be separated when the used air guide plate is reused.

SUMMARY OF THE INVENTION

The present invention has been made in the light of the situations described above, and an object of the invention is to provide a novel structure of an air guide plate that can easily realize a stable sealing properties for preventing the air from leaking or escaping through the gap between the air guide plate and the automobile part disposed around the automobile part, and excellent recycling efficiency, at a low cost. It is another object of the present invention to provide an improved sealing structure which advantageously secures the sealing properties between the air guide plate and the automobile part disposed around the air guide plate by using the air guide plate that has an excellent recycling efficiency and can be produced easily at a low cost, thereby surely preventing the air from leaking through the gap between the air guide plate and the automobile part.

To achieve the aforementioned objects, or to solve the problems understood from description throughout the present specification and drawings, the present invention may be preferably embodied according to various aspects which will be described below. Each aspect described below may be employed in any combination. It is to be understood that the aspects and technical features of the present invention are not limited to those described below, and can be recognized based on the inventive concept disclosed in the whole specification and drawings.

The above-described object regarding the air guide plate of the present invention may be attained according to a principle of the invention, which provides an air guide plate for guiding an air flow produced during driving of an automobile to a radiator, the air guide plate being disposed at a front of the automobile so as to extend in a front and back direction of the automobile, comprising: (a) a plate body which is formed of a resin material and arranged at a front of an automobile without being connected to at least one automobile part disposed around the front of the automobile; and (b) at least one deformable skirt portion which is thin and integrally formed on an outer periphery of the plate body by using the same resin material as the plate body, the at least one deformable skirt portion being disposed so as to be in contact with the at least one automobile part under flexural deformation while the plate body is disposed at the front of the vehicle.

According to a favorable aspect of the air guide plate of the present invention, the at least one deformable skirt portion is disposed so as to be in contact with the at least one automobile part such that the at least one deformable skirt portion is allowed to be subjected to a further flexural deformation when the at least one automobile part and the plate body are relatively displaced so as to be close to each other.

It is advantageous in the present invention to provide the air guide plate for guiding the air flow produced during driving of the automobile to the radiator, the air guide plate being disposed between a shroud, which is disposed so as to cover sides of the radiator of the automobile, and a bumper, which is located in front of the shroud, such that the air guide plate extends in a front and back direction of the automobile, the air guide plate comprising: (a) a plate body which is formed of a resin material and arranged between the shroud and the bumper without being connected to the shroud and the bumper; and (b) at least one deformable skirt portion which is thin and integrally formed on an outer periphery of the plate body by using the same resin material as the plate body, the at least one deformable skirt portion being disposed so as to be in contact with the shroud and the bumper under flexural deformation while the plate body is disposed at the front of the vehicle.

According to a preferable aspect of the air guide plate of the present invention, the resin material for forming the plate body and the at least one deformable skirt portion is a blend of polypropylene and polyethylene.

According to another preferable aspect of the air guide plate of the present invention, the resin material for forming the plate body and the at least one deformable skirt portion has a flexural modulus within a range of 250 to 800 MPa.

According to a favorable aspect of the air guide plate of the present invention, the plate body has a thickness within a range of 1.2 to 2.5 mm and the at least one deformable skirt portion has a thickness within a range of 0.3 to 0.8 mm.

According to another favorable aspect of the air guide plate of the present invention, the at least one deformable skirt portion has at least one cut extending in a direction intersecting a circumferential direction of the plate body.

The above-described another object regarding the sealing structure of the present invention may be attained according to another principle of the invention, which provides a sealing structure for preventing air from leaking through at least one gap formed between an air guide plate, which guides an air flow produced during driving of an automobile to a radiator, and at least one automobile part, which is disposed around the air guide plate, the air guide plate being disposed at a front of the automobile so as to extend in a front and back direction of the automobile, where the air guide plate comprises a plate body formed of a resin material and at least one deformable skirt portion which is thin and integrally formed on an outer periphery of the plate body by using the same resin material as the plate body, and the plate body is disposed at the front of the automobile without being connected to the at least one automobile part, and the at least one deformable skirt portion is disposed so as to be in contact with the at least one automobile part under flexural deformation, thereby closing the at least one gap by the at least one deformable skirt portion to prevent the air from leaking therethrough.

According to a preferable aspect of the sealing structure of the present invention, the at least one deformable skirt portion is disposed so as to be in contact with the at least one automobile part such that the at least one deformable skirt portion is allowed to be subjected to a further flexural deformation when the at least one automobile part and the plate body are relatively displaced so as to be close to each other.

It is advantageous in the present invention to provide the sealing structure for preventing air from leaking through the at least one gap formed between the air guide plate, which guides an air flow produced during driving of an automobile to the radiator, and at least one of a shroud and a bumper, the air guide plate being disposed between the shroud, which is disposed so as to cover sides of the radiator of the automobile, and the bumper, which is located in front of the shroud, such that the air guide plate extends in a front and back direction of the automobile, where the air guide plate comprises a plate body formed of a resin material and at least one deformable skirt portion which is thin and integrally formed on an outer periphery of the plate body by using the same resin material as the plate body, and the plate body is disposed between the shroud and the bumper without being connected to the shroud and the bumper, and the at least one deformable skirt portion is disposed so as to be in contact with the shroud and the bumper under flexural deformation, thereby closing the at least one gap by the at least one deformable skirt portion to prevent the air from leaking therethrough.

Specifically, in the air guide plate of the present invention, the at least one deformable skirt portion provided on the periphery of the plate body is arranged so as to be in contact with the at least one automobile part positioned around the plate body under flexural deformation, thereby filling the gap between the outer periphery of the plate body and the at least one automobile part. As a result, the air is prevented from leaking through the gap. Therefore, when the plate body and the automobile part are relatively displaced by the input vibration during driving of the automobile, for example, the flexural deformation amount of the at least one deformable skirt portion is increased or decreased depending on the relative displacement. As a result, the contact between the at least one deformable skirt portion and the at least one automobile part is maintained to the maximum extent possible. In other words, the at least one deformable skirt portion advantageously keeps filling the gap between the outer periphery of the plate body and the at least one automobile part. Therefore, the air is surely and stably prevented from leaking through the gap during driving, thereby sufficiently exhibiting the sealing properties between the air guide plate and the at least one automobile part.

The air guide plate for automobile of the present invention includes the at least one deformable skirt portion and the plate body that are made of the same resin material. Therefore, unlike the conventional products including the deformable skirt portion and the plate body made of different materials, the present invention requires only one formation material. Thus, the cost of material can be kept low. Further, the used air guide plate of the present invention can be recycled (utilized again) without separating the plate body and the deformable skirt portion. In addition, the deformable skirt portion of the air guide plate of the present invention can exhibit sufficient flexibility, because it is thinner than the plate body. In other words, the plate body is thicker than the deformable skirt portions. With this thickness arrangement, although the plate body and the deformable skirt portion are made of the same resin material, the plate body exhibits adequate rigidity. Thus, sufficient air guiding properties can be secured.

Further, the air guide plate for automobile of the present invention is constituted by an integrally molded product including the plate body and the at least one deformable skirt portion. Therefore, unlike the conventional products in which a cushioning material that is a separate member from the plate body is bonded to the outer periphery of the air guide plate member, a process for joining the plate body and the deformable skirt portion is not required at the time of production. As a result, productivity thereof can be advantageously improved.

Accordingly, the air guide plate for automobile of the present invention can surely and stably prevent the air from leaking through the gap between the air guide plate and the at least one automobile part positioned around it, thereby effectively and sufficiently exhibiting stable sealing properties to the gap. Further, the structure that exhibits such a stable sealing properties can be easily achieved at a low cost, while securing excellent recycling properties. As a result of the above, cooling efficiency of the radiator and aerodynamic performance can be advantageously improved.

Further, in the air guide plate of the present invention, the at least one deformable skirt portion integrally formed on the outer periphery of the plate body is disposed so as to be in contact with the at least one automobile part under flexural deformation. The at least one automobile part is disposed around the plate body without being connected to the air guide plate. Thus, when the at least one automobile part and the plate body are relatively displaced so as to close to each other upon input of the impact load by light collision, for example, the impact load can be advantageously reduced or absorbed by a further flexural deformation of the at least one deformable skirt portion formed on the plate body.

The sealing structure of the present invention can advantageously obtain substantially the same advantages as those of the above-described air guide plate for automobile, because the sealing structure employs the air guide plate for automobile of the present invention having the above characteristics.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE INVENTION

To further clarify the present invention, there will be described in detail embodiments of the present invention with reference to the accompanying drawings.

Figure 1:
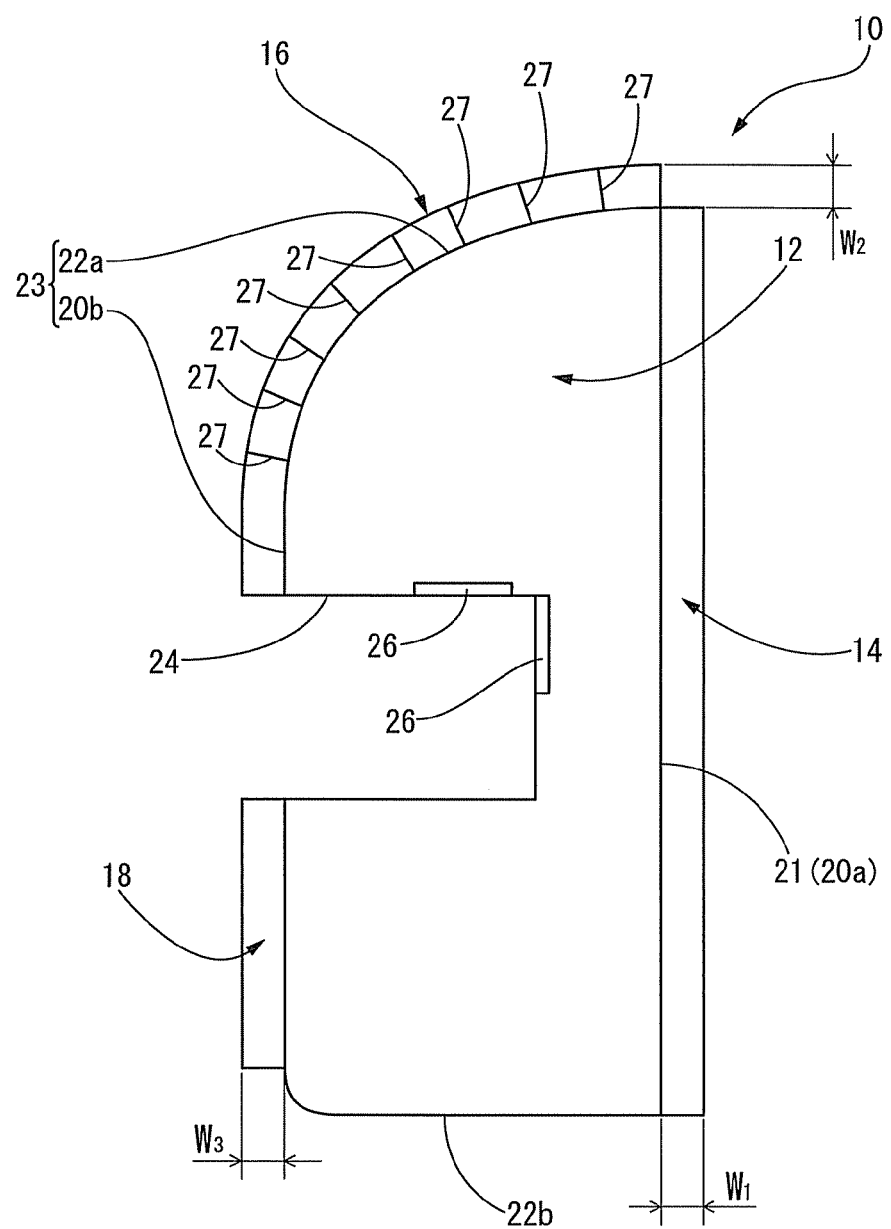
FIG. 1 is a front view illustrating one embodiment of an air guide plate having a structure of the present invention.

Initially, FIG. 1 is a front view illustrating an embodiment of an air guide plate of the present invention. As apparent from FIG. 1, the air guide plate 10 of the present embodiment includes a plate body 12 having a substantially vertically long rectangular shape as a whole and first, second and third deformable skirt portions 14, 16, and 18 integrally formed on the outer periphery (end portion of the outer periphery or surface of the outer periphery) of the plate body 12.

More specifically described, the plate body 12 includes: a first long side 20a and a second long side 20b, which extend straight in the vertical direction; a first short side 22a, which extends so as to connect upper ends of the first and second long sides 20a and 20b; and a second short side 22b, which extends so as to connect lower ends of the first and second long sides 20a and 20b. Further, the first short side 22a has a curved shape that curves obliquely downward from the first long side 20a side to the second long side 20b side.

In the plate body 12, the first long side 20a has a shape corresponding to the front surface of a vertical wall of a shroud, which will be described later, i.e., the first long side 20a is made as a rear peripheral edge 21 having a shape extending straight in a vertical direction. Further, the second long side 20b extends straight in a vertical direction and the first short side 22a extends obliquely downward from the first long side 20a side to the second long side 20b side. In other words, the first short side 22a and the second long side 20b form a front peripheral edge 23 that has a shape corresponding to the inner surface of the bumper cover, which will be described later. In the substantially middle portion in the longitudinal direction of the front peripheral edge 23, a notch or cut-out 24 having a rectangular shape is provided. Further, two mounting projections 26, 26 having a plate shape are integrally provided on one surface in the thickness direction of the plate body 12 at the periphery of the notch 24.

Each of the first deformable skirt portion 14, the second deformable skirt portion 16, and the third deformable skirt portion 18, which are integrally formed on the outer periphery of the plate body 12, has a flat shape having a constant small width and a thickness smaller than the plate body 12. The first deformable skirt portion 14 is formed along the rear peripheral edge 21 (the first long side 20a) so as to extend straight continuously over substantially the entire length thereof. The second deformable skirt portion 16 is formed on a portion above the notch 24 of the front peripheral edge 23 (consisting of the first short side 22a and the second long side 20b), and extends continuously over substantially the entire length of the portion above the notch 24 while curving along it. The third deformable skirt portion 18 is formed on a portion below the notch 24 of the front peripheral edge 23, and extends straight continuously along the portion below the notch 24 over substantially the entire length thereof.

Of the first to third deformable skirt portions 14, 16, and 18, the second deformable skirt portion 16 having a curved shape has a plurality of cuts 27 extending in a width direction (a direction intersecting an extending direction of the second deformable skirt portion 16) with a predetermined distance therebetween in the extending direction. Accordingly, when the second deformable skirt portion 16 is subjected to flexural deformation, portions of the second deformable skirt portion 16, which are positioned at both sides of each of the plurality of cuts 27 in the extending direction of the front peripheral edge 23, are apart from each other or overlapped with each other. Thus, the second deformable skirt portion 16 can be more smoothly deformed than the case where the cuts 27 are not provided.

As described above, the air guide plate 10 of the present embodiment is constituted by an integrally molded product (for example, injection molded product) in which the plate body 12 and the first to third deformable skirt portions 14, 16, and 18 are integrally formed by using one resin material. Here, as the formation material of the air guide plate 10, a blend (polymer alloy) of polypropylene and polyethylene (low-density polyethylene) is employed.

As is well known, the blend of polypropylene and polyethylene exhibits a sufficient flexural rigidity by having a sufficiently large thickness and an adequate flexibility by having a sufficiently small thickness. In the present embodiment, in order to exhibit the sufficient flexural rigidity, which is obtained by making the thickness thereof large, and the adequate flexibility, which is obtained by making the thickness thereof small, in a good balance, it is preferable that the blend of polypropylene and polyethylene having a flexural modulus within a range of about 250 to 800 MPa be used as a formation material of the air guide plate 10. If the flexural modulus of the blend of polypropylene and polyethylene is less than 250 MPa, sufficient flexural rigidity may not be obtained even if the thickness of the plate body 12 is made large. On the other hand, if the flexural modulus is more than 800 MPa, the flexibility of the first to third deformable skirt portions 14, 16, and 18, which have small thickness, may be insufficient.

In the air guide plate 10 of the present embodiment, the plate body 12 has such a thickness as to secure sufficient flexural rigidity, and each of the first to third deformable skirt portions 14, 16, and 18 has such a small thickness as to exhibit the adequate flexibility. Specifically, the thickness of the plate body 12 is about 1.2 to 2.5 mm, for example, and the thickness of each of the first to third deformable skirt portions 14, 16, and 18 is about 0.3 to 0.8 mm, for example.

If the thickness of the plate body 12 is less than 1.2 mm, the flexural rigidity of the plate body 12 may be insufficient. Thus, when the air guide plate having such a thickness is disposed between the bumper cover and the shroud, as described later, it may be difficult to guide the air from the bumper cover side to the shroud side. On the other hand, if the thickness of the plate body 12 is more than 2.5 mm, the weight of the plate body 12, eventually of the air guide plate 10, is increased. Further, if the thickness of each of the first to third deformable skirt portions 14, 16, and 18 is less than 0.3 mm, the strength of each of the first to third deformable skirt portions 14, 16, and 18 becomes excessively small. On the other hand, if the thickness of each of the first to third deformable skirt portions 14, 16, and 18 is more than 0.8 mm, the flexibility of the deformable skirt portions 14, 16, and 18 may be insufficient.

Figure 2:
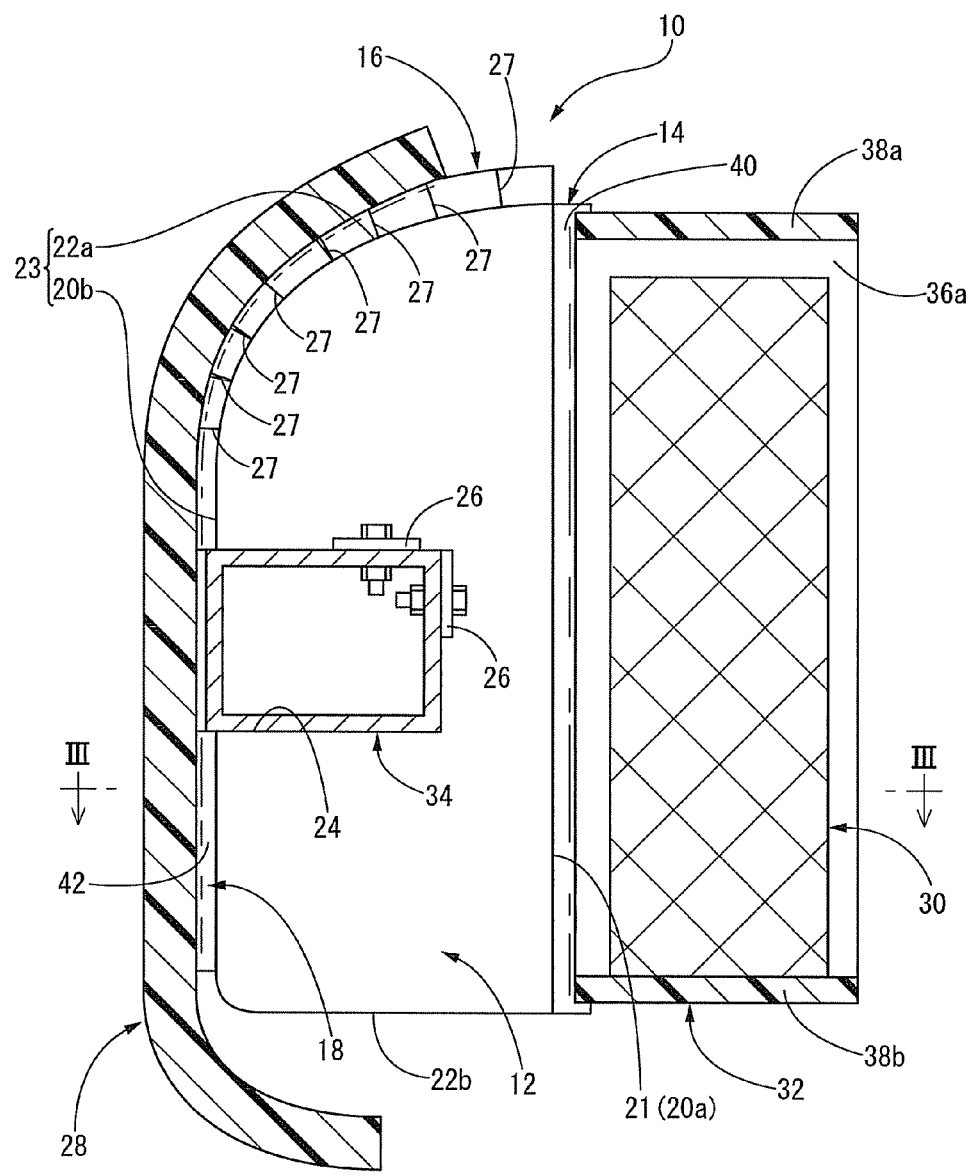
FIG. 2 is a cross sectional view illustrating a state in which the air guide plate illustrated in FIG. 1 is disposed between the shroud and the bumper, and the gaps between the air guide plate and the shroud and between the air guide plate and the bumper are sealed.
Figure 3:
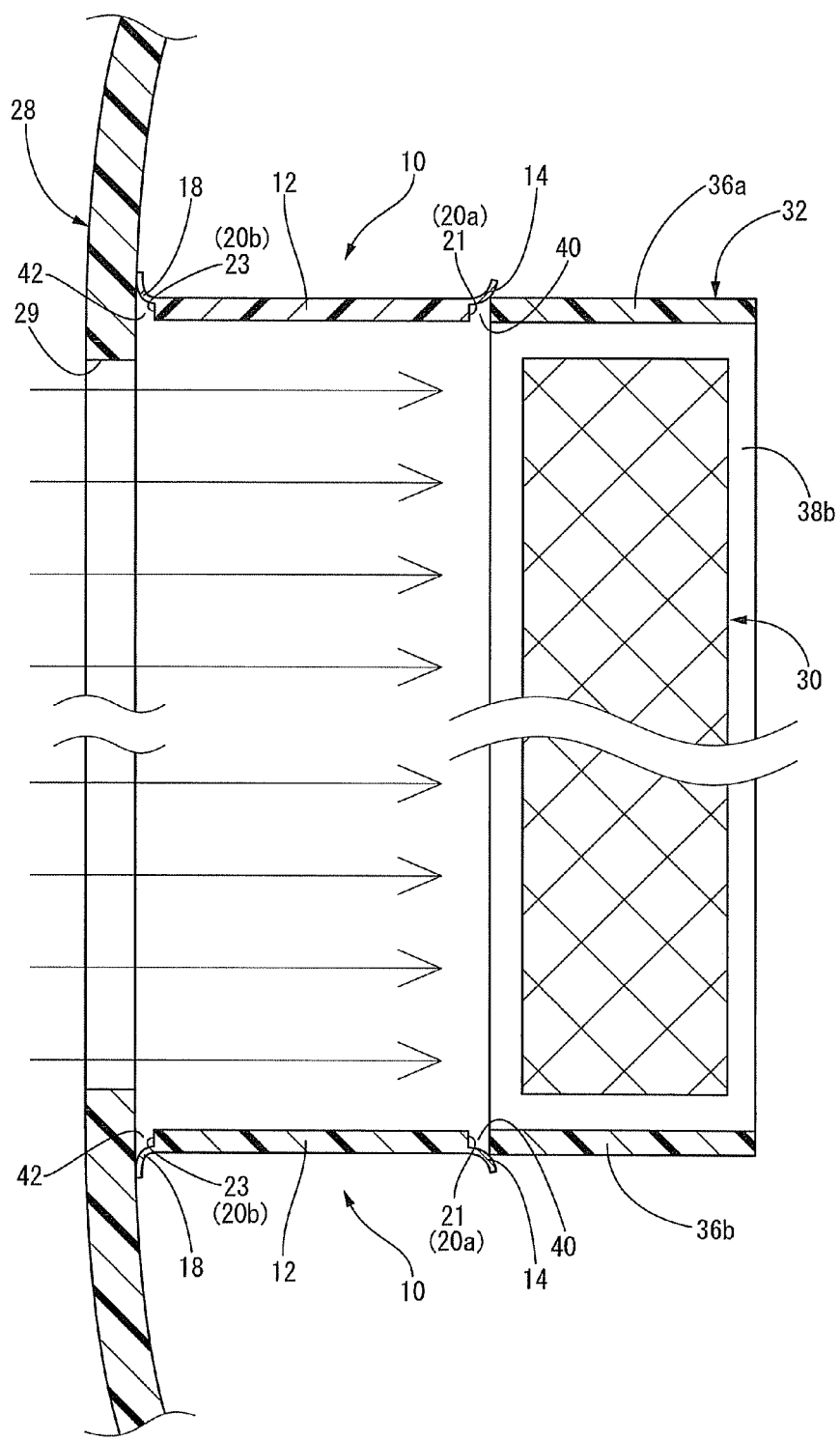
FIG. 3 is a cross sectional view taken along line III-III of FIG. 2.

As illustrated in FIG. 2 and FIG. 3, the air guide plate 10 of the present embodiment having the above structure is disposed between a bumper cover 28, which is an automobile part, and a shroud 32, which is another automobile part and disposed so as to surround a radiator 30 positioned in back of the bumper cover 28, such that the air guide plate 10 extends in the front and back direction of the automobile. Further, according to the present embodiment, another air guide plate 10 is disposed so as to be adjacent to the air guide plate 10 with a predetermined distance therebetween in a vehicle width direction. Accordingly, the air flow during driving of the automobile can be guided to the radiator 30 by the two air guide plates 10, 10.

Here, a cross sectional shape of the bumper cover 28 is a curved shape protruding to the front. The bumper cover 28 is fixed to a bumper reinforcement 34 which is disposed at the front of the automobile and extends in the vehicle width direction. Further, the bumper cover 28 has an air inlet 29 at the middle portion thereof in the vehicle width direction.

The shroud 32 has a rectangular cylindrical shape, as a whole, that is slightly larger than the radiator 30. The shroud 32 is disposed so as to extend in the front and back direction of the automobile and fixed while being externally disposed on the radiator 30. Specifically, the shroud 32 integrally includes two vertical walls 36a, 36b that extend straight in the vertical direction and two horizontal walls 38a, 38b that extend straight in the vehicle width direction. The two vertical walls 36a, 36b and two horizontal walls 38a, 38b are arranged so as to cover the four sides of the radiator 30, i.e., upper, lower, left and right surfaces of the radiator, such that they space apart a predetermined distance from the four side surfaces of the radiator 30.

The two air guide plates 10, 10, which are positioned between the bumper cover 28 and the shroud 32, are positioned at the front of the two vertical walls 36a, 36b of the shroud 32 such that the rear peripheral edge 21 of each of the plate bodies 12, 12 extends in the vertical direction along each of the vertical walls 36a, 36b. Further, under such installation of the air guide plates 10, 10, an end face of the rear peripheral edge 21 of each of the plate bodies 12, 12 and a front end face of each of the vertical walls 36a, 36b are opposed to each other in the front and back direction with a predetermined distance therebetween. As a result, a back side gap 40 as the designed gap is formed so as to extend in the vertical direction between the end face of the rear peripheral edge 21 and the front face of each of the vertical walls 36a, 36b. In other words, the plate bodies 12, 12 are not connected or fixed to the shroud 32.

The two air guide plates 10, 10 are positioned at the back of the bumper cover 28 such that the front peripheral edge 23 of each of the plate bodies 12, 12 extends in the vertical direction along the inner surface of the bumper cover 28. Further, under installation of the air guide plates 10, 10, an end face of the front peripheral edge 23 of each of the plate bodies 12, 12 and the inner surface of the bumper cover 28 are opposed to each other in the front and back direction with a predetermined distance therebetween. As a result, a front side gap 42 as the designed gap is formed so as to extend in the vertical direction between the end surface of the front peripheral edge 23 and inner surface of the bumper cover 28. In other words, the plate bodies 12, 12 are also not connected or fixed to the bumper cover 28.

Further, the two air guide plates 10, 10 that are positioned between the bumper cover 28 and the shroud 32 as described above are fastened, at the mounting projections 26 thereof with bolts, to the bumper reinforcement 34, which is inserted into the notches 24, 24.

In the air guide plate 10 of the present embodiment, in a state in which the air guide plates 10, 10 are fixed to the bumper reinforcement 34, the first deformable skirt portion 14, which is integrally formed on the rear peripheral edge 21 of the plate body 12, is in contact with the vertical wall 36a (36b) of the shroud 32 at the front side portion thereof while the first deformable skirt portion 14 is subjected to flexural deformation. The second deformable skirt portion 16 and the third deformable skirt portion 18, which are integrally formed on the front peripheral edge 23 of the plate body 12, are in contact with the inner surface of the bumper cover 28 at the front side portions thereof, while they are subjected to flexural deformation.

Although the width of each of the first to third deformable skirt portions 14, 16, and 18 (dimensions illustrated in FIG. 1 as $W_1$, $W_2$, and $W_3$) is not particularly limited, the width is preferably within a range of 5 to 30 mm. By making the width of each of the first to third deformable skirt portions 14, 16, and 18 more than 5 mm, the width thereof becomes bigger than the general width of the back and front side gaps 40, 42. As a result, the front end portions of the first to third deformable skirt portions 14, 16, and 18 are surely in contact with the vertical wall 36a of the shroud 32 and the bumper cover 28 under flexural deformation. Further, by making the width of each of the first to third deformable skirt portions 14, 16, and 18 less than 30 mm, it can be prevented that each of the first to third deformable skirt portions 14, 16, and 18 has a width bigger than necessary. As a result, it can be prevented that the weight of the air guide plate 10 is increased by the formation of the first to third deformable skirt portions 14, 16, and 18, to the maximum extent possible.

Consequently, the back side gap 40 which is formed between the rear peripheral edge 21 of the plate body 12 of the air guide plate 10, which is disposed between the bumper cover 28 and the shroud 32, and the vertical wall 36a of the shroud 32, is surely sealed by the first deformable skirt portion 14. Further, the other back side gap 40 formed between the rear peripheral edge 21 of the other plate body 12 and the other vertical wall 36b of the shroud 32 is surely sealed in the same way by the first deformable skirt portion 14. Further, the front side gap 42, which is formed between the front peripheral edge 23 of the plate body 12 of the air guide plate 10 and the inner surface of the bumper cover 28, is surely sealed by the second and third deformable skirt portions 16, 18. Further, the other front side gap 42 formed between the front peripheral edge 23 of the other plate body 12 and the inner surface of the bumper cover 28 is surely sealed in the same way by the second and third deformable skirt portions 16, 18.

Under the installation of the air guide plate 10 between the bumper cover 28 and the shroud 32, when the plate body 12 and the shroud 32 are relatively displaced or when the plate body 12 and the bumper cover 28 are relatively displaced, by the input vibration occurred during driving of the automobile, for example, the flexural deformation amount of the first to third deformable skirt portions 14, 16, and 18 is increased or decreased depending on the relative displacement, so that the contact of the first to third deformable skirt portions 14, 16, and 18 with the shroud 32 or bumper cover 28 can be maintained to the maximum extent possible. Accordingly, the back and front side gaps 40, 42 are advantageously kept sealed by the first to third deformable skirt portions 14, 16, and 18.

Further, as described above, the second deformable skirt portion 16 having a curved shape has a plurality of cuts 27. Due to the presence of the plurality of cuts 27, when the second deformable skirt portion 16 is subjected to the flexural deformation and in contact with the curved inner surface of the bumper cover 28, it can be advantageously prevented that the gap is formed between the second deformable skirt portion 16 and the inner surface of the bumper cover 28 by the wrinkle or the like occurred at the second deformable skirt portion 16. Therefore, although the second deformable skirt portion 16 has a curved shape, the front side gap 42 can be effectively kept sealed by the second deformable skirt portion 16.

Consequently, the air guide plate 10 of the present embodiment guides the air flow produced during driving of the automobile to the radiator 30 and surely and stably prevents the air from leaking through the front side gap 42 or the back side gap 40, by being disposed between the bumper cover 28 and shroud 32 in the above described arrangement. Thus, stable sealing properties between the shroud 32 and the bumper cover 28 can be sufficiently exhibited.

Further, the plate body 12 and the first to third deformable skirt portions 14, 16, and 18 of the air guide plate 10 are formed of the same resin material. Thus, unlike the conventional product including the deformable skirt portions and the plate body, which are formed of different materials, only one kind of the formation material is required. As a result, the material cost is advantageously reduced. Further, the used air guide plate 10 can be recycled without a step of separating the plate body 12 and the deformable skirt portions 14, 16, and 18.

Furthermore, the air guide plate 10 of the present embodiment is constituted by an integrally molded product including the plate body 12 and the first to third deformable skirt portions 14, 16, and 18. Thus, unlike the conventional product including the cushioning material which is bonded to the outer periphery of the plate body, instead of deformable skirt portions, the air guide plate 10 of the present embodiment does not require a bonding process in addition to the molding process of the plate body 12. As a result, productivity of the air guide plate can be advantageously improved.

Accordingly, the air guide plate 10 of the present embodiment advantageously and sufficiently exhibits stable sealing properties by preventing the air from passing through the back and front side gaps 40, 42 formed between the air guide plate 10 and the shroud 32 or the bumper cover 28. In addition, the structure which exhibits the stable sealing properties can be realized easily at a low cost with the excellent recycling properties. Further, as a result of the above, the cooling efficiency of the radiator 30 and the aerodynamic performance can be advantageously improved.

The air guide plate 10 of the present embodiment is not connected or fixed to the shroud 32 and the bumper cover 28. Therefore, when the shroud 32 or bumper cover 28 and the air guide plate 10 are relatively displaced so as to be close to each other due to the impact load inputted in a light collision, the impact load can be advantageously reduced or absorbed, because the first to third deformable skirt portions 14, 16, and 18, which are in contact with the shroud 32 and the bumper cover 28 under flexural deformation, are subjected to a further flexural deformation.

While the specific embodiment of the present invention has been described in detail, for illustrative purpose only, it is to be understood that the present invention is not limited to the details of the illustrated embodiments.

For example, the sealing structure of the front and back side gaps 42, 40 are not necessarily provided by only the first to third deformable skirt portions 14, 16, and 18, which are integrally formed on the outer periphery of the plate body 12. The front and back side gaps 42, 40 may be partly sealed by the sealing member made of a cushioning material, for example, that is bonded to a part of the outer periphery of the plate body 12.

For example, when an air conditioning hose whose temperature becomes high is provided between the horizontal wall 38b of the shroud 32, which is positioned below the radiator 30, and the rear peripheral edge 21 of the plate body, the gap formed between the rear peripheral edge 21 of the plate body 12 and the air conditioning hose may be sealed by a sealing member formed of a cushioning material having a heat resistance properties, for example. The sealing member is provided at the end portion of the rear peripheral edge 21 such that it is in contact with the air conditioning hose. Further, when the outer surface of the automobile part that is positioned around the outer periphery of the plate body 12 with a predetermined distance therebetween has a complex shape, the gap between the automobile part and the plate body 12 may be sealed by a sealing member formed of a cushioning material, which can be easily deformed. In such a case, the sealing member is provided at a portion of the plate body 12 opposing to the automobile part such that it is in contact with an outer surface of the automobile part.

The automobile part which forms a gap to be sealed together with the plate body 12 is not limited to the above described shroud, bumper cover, air conditioning hose, or the like. All automobile parts which are disposed around the plate body 12 and form a gap together with the plate body 12 (which is a component of the air guide plate 10 other than the first to third deformable skirt portions 14, 16, and 18) under installation of the air guide plate 10 to the automobile may be the automobile part forming the gap to be sealed together with the plate body 12. Examples of the automobile parts include a radiator, radiator support, bumper reinforcement, lower absorber, upper absorber, harness, various hoses, and another air guide plate that is adjacent to the air guide plate.

In the present embodiment, both of the back side gap 40, which is formed between the shroud 32 and the plate body 12, and the front side gap 42, which is formed between the bumper cover 28 and the plate body 12, are sealed by the first to third deformable skirt portions 14, 16, and 18. However, at least one of the first to third deformable skirt portions 14, 16, and 18 may be omitted to seal only one of the back side gap 40 and the front side gap 42.

It is to be understood that the entire shape of the plate body 12 may be suitably changed depending on shape of the front of the automobile in which the plate body 12 is disposed, for example.

The number, shape and formation position of the deformable skirt portion are not particularly limited, as long as the deformable skirt portion can be integrally formed on the outer periphery of the plate body.

Although further details will not be described herein, it is to be understood that the present invention may be embodied with various other changes and modifications which may occur to those skilled in the art, without departing from the spirit and scope of the invention.

What is claimed is:

1. An air guide plate for guiding an air flow produced during driving of an automobile to a radiator, the air guide plate being disposed at a front of the automobile so as to extend in a front and back direction of the automobile, comprising:
    a plate body which is formed of a resin material and arranged at a front of an automobile between at least one automobile part disposed at the front of the automobile and another part in contact with the radiator without being connected to either of the at least one automobile part disposed at the front of the automobile and the another part in contact with the radiator; and
    at least one deformable skirt portion which is thin and integrally formed on an outer periphery of the plate body by using the same resin material as the plate body, the at least one deformable skirt portion being disposed so as to be in contact with the at least one automobile part and a front face of the another part in contact with the radiator under flexural deformation while the plate body is disposed at the front of the vehicle,
    wherein an entirety of the at least one deformable skirt portion has a thickness within a range of 0.3 to 0.8 mm.

2. The air guide plate according to claim 1, wherein the at least one deformable skirt portion is disposed so as to be in contact with the at least one automobile part such that the at least one deformable skirt portion is allowed to be subjected to a further flexural deformation when one of the at least one automobile part and the plate body are displaced toward the other of the at least one automobile part and the plate body.

3. The air guide plate according to claim 1, wherein the air guide plate is disposed between a shroud, which is disposed so as to cover sides of the radiator of the automobile, and a bumper, which is located in front of the shroud, and the at least one automobile part includes the bumper.

4. The air guide plate according to claim 3, wherein the another part in contact with the radiator is the shroud.

5. The air guide plate according to claim 1, wherein the resin material for forming the plate body and the at least one deformable skirt portion is a blend of polypropylene and polyethylene.

6. The air guide plate according to claim 1, wherein the resin material for forming the plate body and the at least one deformable skirt portion has a flexural modulus within a range of 250 to 800 MPa.

7. The air guide plate according to claim 1, wherein the plate body has a thickness within a range of 1.2 to 2.5 mm.

8. The air guide plate according to claim 1, wherein the at least one deformable skirt portion has at least one cut extending in a direction intersecting a circumferential direction of the plate body.

9. An air guide structure for guiding an air flow produced during driving of an automobile from a bumper side to a radiator side, wherein the air guide structure comprises the air guide plate according to claim 1.

10. The air guide plate according to claim 1, wherein the at least one deformable skirt portion and plate body further comprise a cutout which includes mounting projections for mounting the air guide plate.

11. A sealing structure for preventing air from leaking through at least one gap formed between an air guide plate, which guides an air flow produced during driving of an automobile to a radiator, and at least one automobile part, which is disposed around the air guide plate, the air guide plate being disposed at a front of the automobile so as to extend in a front and back direction of the automobile,
    wherein the air guide plate comprises a plate body formed of a resin material and at least one deformable skirt portion which is thin and integrally formed on an outer periphery of the plate body by using the same resin material as the plate body, and
    the plate body is disposed at the front of the automobile without being connected to the at least one automobile part, and the at least one deformable skirt portion is disposed so as to be in contact with the at least one automobile part and a front face of the another part in contact with the radiator under flexural deformation, thereby forming the sealing structure for closing the at least one gap by the at least one deformable skirt portion to prevent the air from leaking therethrough,
    wherein an entirety of the at least one deformable skirt portion has a thickness within a range of 0.3 to 0.8 mm.

12. The sealing structure according to claim 11, wherein the at least one deformable skirt portion is disposed so as to be in contact with the at least one automobile part such that the at least one deformable skirt portion is allowed to be subjected to a further flexural deformation when one of the at least one automobile part and the plate body are displaced toward the other of the at least one auto part and the plate body.

13. The sealing structure according to claim 11, wherein the air guide plate is disposed between a shroud, which is disposed so as to cover sides of the radiator of the automobile, and a bumper, which is located in front of the shroud, and the at least one automobile part includes the shroud and the bumper.

* * * * *